US006598071B1

United States Patent
Hayashi et al.

(10) Patent No.: US 6,598,071 B1
(45) Date of Patent: Jul. 22, 2003

(54) COMMUNICATION APPARATUS AND METHOD OF HAND OVER OF AN ASSIGNED GROUP ADDRESS FROM ONE COMMUNICATION APPARATUS TO ANOTHER

(75) Inventors: Kenji Hayashi, Hadano (JP); Naoya Ikeda, Ebina (JP); Yoshifumi Atarashi, Ebina (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/360,688

(22) Filed: Jul. 26, 1999

(30) Foreign Application Priority Data

Jul. 27, 1998 (JP) .......................................... 10-210732

(51) Int. Cl.⁷ ............................................. G06F 15/16
(52) U.S. Cl. ...................... 709/203; 709/201; 709/220; 709/224; 709/245; 709/223; 370/256; 370/465
(58) Field of Search ................................. 709/203, 220, 709/226, 240, 201, 227, 231, 200, 105, 219, 245, 224, 223; 370/465, 256; 712/27

(56) References Cited

U.S. PATENT DOCUMENTS

| | | | | |
|---|---|---|---|---|
| 5,774,660 A | * | 6/1998 | Brendel et al. ............. | 709/201 |
| 5,835,725 A | * | 11/1998 | Chiang et al. .............. | 709/228 |
| 5,848,234 A | * | 12/1998 | Chernick et al. ........... | 709/203 |
| 6,003,083 A | * | 12/1999 | Davies et al. .............. | 709/226 |
| 6,006,264 A | * | 12/1999 | Colby et al. ............... | 709/220 |
| 6,018,771 A | * | 1/2000 | Hayden ...................... | 709/231 |
| 6,052,718 A | * | 4/2000 | Gifford ....................... | 709/219 |
| 6,070,191 A | * | 5/2000 | Narendran et al. ......... | 709/226 |
| 6,092,178 A | * | 7/2000 | Jindal et al. ................ | 712/27 |
| 6,108,701 A | * | 8/2000 | Davies et al. .............. | 709/203 |
| 6,112,239 A | * | 8/2000 | Kenner et al. .............. | 709/105 |
| 6,119,143 A | * | 9/2000 | Dias et al. .................. | 709/105 |
| 6,175,869 B1 | * | 1/2001 | Ahuja et al. ................ | 709/105 |
| 6,185,598 B1 | * | 2/2001 | Farber et al. ............... | 709/200 |
| 6,195,680 B1 | * | 2/2001 | Goldszmidt et al. ........ | 709/203 |
| 6,205,477 B1 | * | 3/2001 | Johnson et al. ............. | 709/220 |
| 6,226,684 B1 | * | 5/2001 | Sung et al. .................. | 709/238 |
| 6,247,055 B1 | * | 6/2001 | Cotner et al. ............... | 709/227 |
| 6,253,230 B1 | * | 6/2001 | Couland et al. ............. | 709/202 |
| 6,259,705 B1 | * | 7/2001 | Takahashi et al. .......... | 370/465 |
| 6,304,913 B1 | * | 10/2001 | Rune .......................... | 709/241 |
| 6,314,465 B1 | * | 11/2001 | Paul et al. ................... | 709/226 |
| 6,327,252 B1 | * | 12/2001 | Silton et al. ................ | 370/256 |

FOREIGN PATENT DOCUMENTS

| | | |
|---|---|---|
| JP | 7-154399 | 6/1995 |
| JP | 7-319835 | 12/1995 |
| JP | 9-244979 | 9/1997 |
| JP | 9-319689 | 12/1997 |
| JP | 10-23074 | 1/1998 |

* cited by examiner

Primary Examiner—Ayaz Sheikh
Assistant Examiner—Thu Ha Nguyen
(74) Attorney, Agent, or Firm—Mattingly, Stanger & Malur, P.C.

(57) ABSTRACT

Unique addresses are provided to identify and communicate with each of a plurality of servers and a client connected on a network. A group address which differs from the unique address is assigned to any of the plurality of servers. The client specifies that group address when receiving service from the server. The traffic status of the communication path between server and client is monitored and if factors such as communication speed and response time have exceeded a preset threshold, the group address is dynamically passed to another server.

Thereby a communications system is able to dynamically switch servers, the source for generating traffic, on the network without rerouting of paths on which traffic is concentrated and requiring no change settings or addition of control functions by the client and further able to effectively use portions of the network having low usage rates.

8 Claims, 8 Drawing Sheets

COMMUNICATION APPARATUS AND METHOD OF HAND OVER OF AN ASSIGNED GROUP ADDRESS FROM ONE COMMUNICATION APPARATUS TO ANOTHER

BACKGROUND OF THE INVENTION

1. Field of the Invention

This invention relates to a communication system and traffic control technology for computer networks connecting a plurality of server computers (hereafter simply referred to as "servers") and client computers (hereafter simply referred to as "clients") and relates in particular to communication systems for dispersing the overall traffic of the network by dynamically switching the server performing client communications based on the status of traffic or vacant (idle) bandwidth of the network.

2. Description of the Prior Art

In the computer network system connecting server and client in the technology of the prior art, generally, a plurality of servers are connected for dispersing the communications load and preventing impediments to operation. In such cases, service requests from a client tend to concentrate on a particular server, causing a poor service response to the client's request. Therefore, various technology has been proposed in the prior art involving various kinds of traffic control and dispersion of the load on the server. The following literature are related as examples.

A technology is known in Japanese Patent Laid-open No. 9-319689 for selecting an alternate server from a list of candidates servers distributed previously to the client from the name server, when a fault occurs on the server. This technology however becomes expensive since a special process must be provided to the client for selecting the server. This technology has the further drawback of only dealing with load on the server and fails to take into any account whatsoever the load on the network being used. This technology also requires that a fixed substitute server be prepared which drives up the cost still further.

A technology is disclosed in Japanese Patent Laid-open No. 7-154399 for revealing a feedback technology for controlling the data flow amount to the network by utilizing a window for regulating data to a buffer size capable of being transmitted and received on the network. This feedback technology helps avoid congestion however a physical and logically fixed position for client and server is required so that overall network resources are not used efficiently.

A technology is also disclosed in Japanese Patent Laid-open No. 7-319835 for dispersing the load on the server by dispersing files according to the frequency at which a file possessed by a server is accessed. This technology fails to take into account dispersion of the load on the network.

In the technology disclosed in Japanese Patent Laid-open No. 9-244979, re-distribution of service resources is performed based on the frequency of server access and fails to take the load on the network and the congestion status into any account whatsoever. In this technology, re-distribution of service resources requires that the client be aware of the destination address and make the necessary changes.

In the technology disclosed in Japanese Patent Laid-open No. 10-023074, the server is switched when a problem occurs on the server and absolutely no consideration is given to occasions when the network load has increased. Also, this server switching cannot be accomplished unless the server to be switched to is known and unless the required data and applications exist on this next server to be selected. Further, under the precondition that the server of the spare system operate when the server of the currently used system is down, the unique address of the current system server must be handed over to the spare system server so that the server of the currently used system cannot be utilized once switching to the spare server has been performed. In other words, creating the problems that service cannot be performed with the unique address after switching servers, or that communication is disabled in order to perform maintenance and management.

SUMMARY OF BY THE INVENTION

Figure 1:
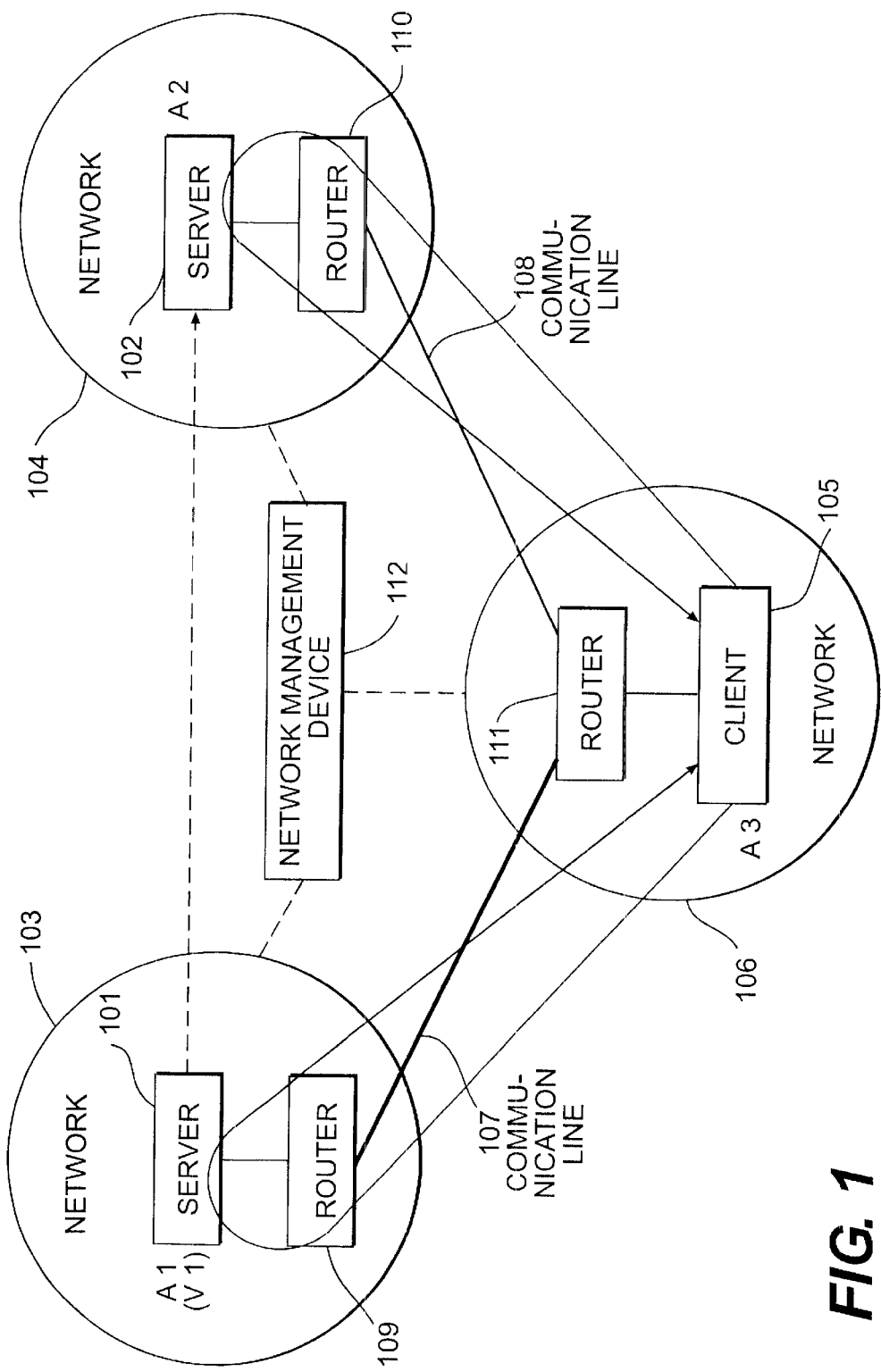
FIG. 1 is a block diagram showing the communications system of the first embodiment of this invention.

Thus, as related above the technology of the conventional art for controlling traffic where the positions of the server and client are fixed, involves the issues of how to re-route traffic between server and client and how to control the flow rate of network and end system communications traffic. These methods have the drawback that the need to prepare rerouting paths beforehand increases costs and the additional problem that service response to the client deteriorates due to the restrictions on traffic flow.

Also, in the server switching technology of the conventional art, the alternate server is provided with the objective of serving as a backup in case of trouble on the current server, making previous setting of the backup server necessary in order to function as a fixed server and this setup and preparation creates the problem of higher costs. A further drawback is that no means were provided to detect the status of load dispersion on the network and dynamically switch the server.

The server switching technology of the prior art, also in many cases requires that settings be made beforehand by the client and in regards to WWW (World Wide Web) servers distributed on a worldwide scale such as the Internet, no technology had been established to dynamically switch servers according to the status of the network traffic without software-changes or any setting changes being made by the client.

If portions of the network that have a low rate of use could be effectively used by dynamically shifting the server on the network without having to re-route or bypass paths where traffic is concentrated, then traffic could be more uniformly distributed along the entire network and as a result, an improvement could be made in the average response time to the client. For instance, by eliminating congestion of trunk networks and making efficient use of lines and servers not used by the overall network on communications systems between server and client such as WWW utilized on the Internet, an improvement could be made in the speed and quality of the communication service provided to the client.

However, in order to evenly distribute the traffic load within the network, one problem is how to acquire information on switching the communication server of the client to another server in a suitable position.

Also, in order to continuously provide service to the client, it is essential that dynamic switching of servers as needed by the client be performed and that the client not be aware that switching is being performed. In other words, switching must be performed without any setting changes or control functions being added by the client.

It is an object of this invention to provide a communications system able to dynamically move servers, the source for generating traffic, on the network.

It is an another object of this invention to provide a communications system able to dynamically move servers without rerouting, or bypassing of paths on which traffic is concentrated and without requiring of change settings or addition of control functions by the client.

It is still another object of this invention to provide a communications system further able to effectively use portions of the network having low usage rates.

In order to achieve the above objects, a communication system by this invention includes concretely the following technique.

Firstly, a unique address is provided for identifying a plurality of servers and clients connected on the network and for establishing communication. Further, a group address differing from the unique address is assigned to any one of these plurality of servers. This group address is specified when the client receives a service from the server. The status of traffic on the communication path between server and client is continually monitored by means of a detection means, and when the communication speed and response time exceed a preset value, the group address is dynamically passed to another server on the communication system by an assignment means. When relay equipment such as a router is present between client and server, the server to which the group address was passed is dynamically switched to becomes the current server, and path information is rewritten in the relay equipment on the network by utilizing a technique called dynamic routing. Thus, a dynamic switch of servers performing communication is performed with no setting changes by the client or software changes being made so that the traffic load is dispersed and the communications speed and response time of the service which the client receives are improved.

Secondly, one technique of this invention for dynamically assigning the group address to the server is shown next. The original server (for switching) sends a switching command packet to the switching server (backup server) in order to hand over the group address. This switching command packet may contain the group address to be handed over or may contain instructions to render effective a group address that was previously set in the backup server and rendered ineffective. Based on information the original server (for switching) has of various types of attribute information and a preset list of a plurality of backup server identification information (unique addresses) as well as information obtained from a means to detect the traffic status on the communication path, an appropriate server is selected and a switching command packet issued so that a group address is dynamically assigned to the backup server and the backup server can take over communications from the original server.

Thirdly, in this invention, the device to transmit the switching command packet has a means to detect traffic, and the network management equipment and relay equipment have decision making functions allowing the optimal dispersion of traffic.

Fourthly, in this invention, relay equipment has a means for dynamically assigning the server group address, when relay equipment is present on the path between server and client. In this method the server group address is utilized as the address for identifying the server during communications between the client and the relay equipment, and this relay equipment is provided with a function to convert the packet address just as the unique address of the server is utilized for communications between the server and relay equipment. A table (called an address conversion table) to match corresponding server unique addresses and group addresses is held in the relay equipment and packet conversion is performed by referring to this table. Dynamically assigning the server group address is achieved by rewriting the relation of corresponding unique address and group addresses in this table. This packet address conversion function can be provided for some or for all of the relay equipment as required by the network configuration. Dynamically switching the server thus can be achieved by dynamically rewriting this address conversion table. The rewriting of this address conversion table is performed by taking rewrite command information from the network management system and relay equipment having the means for detecting traffic status and sending this information to the router possessing the address conversion table.

Fifth, in this invention, when dynamically assigning a group address to a server, the necessary environment required by the server (called the backup server) to be switched to can be arranged by transferring data to be submitted the client from the original server to the backup server.

Sixth, in this invention, when dynamically assigning a group address to a server, the necessary environment required by the backup server can be arranged by transferring the application program from the original server to the backup server.

Seventh, in this invention, a method using a return packet for measuring the response time is used as a means to detect the network traffic status between a server and client. In this method, the server constantly implements a check over a standard time period for response time for a portion or the entire part of the client traffic. The server which is a candidate for use as a backup server must constantly measure the response time per the clients or must measure the response time for command from the current server to a designated client when needed.

Eighth, this invention has a method for detecting the network traffic status between the server and client by placing a traffic measuring means on the communication paths. This traffic measuring means in the relay equipment, monitors all traffic on the communication path between client and server, and with a function to gather statistics, measures items such as overall traffic volume between client and server, other communication traffic volume and traffic volume in idle transmission bandwidths. This information is passed to the currently used server and used as information to decide on switching servers or not.

Finally, this invention has another method for detecting the network traffic status between the server and client. This method utilizes a message sent when a communications packet has been discarded due to congestion on the network. The relay equipment limits the packet flow rate when the traffic flow reaches a point where transmission or reception is disabled due to congestion, and sends a message to the transmission source to discard the packet. A deterioration in communication status is then determined to have occurred or not based on information such as the content of such messages and the number of times such messages occur.

DETAILED DESCRIPTION OF PREFERRED EMBODIMENTS

1. First Embodiment

Hereafter, an embodiment of the communications system of this invention is described for switching servers in order to provide the client with service from server with the fastest communications speed.

FIG. 1 is a simplified block diagram showing the communications system of this embodiment.

In FIG. 1, the reference numeral 101 denotes the current server, 102 is the backup server, 103 is the network for the current server, and 104 is the network for the backup server. The numeral 105 denotes the initial client communicating with the server 101, 106 is the network for the client 105, 107 is the communication line connecting the network 103 and the network 106. The reference numeral 108 denotes the communication line connecting the network 104 and the network 106.

As shown in FIG. 1, in the communication system of this invention, the current server 101 and the backup server 102 have different networks and different communication paths. The communication line 107 has a wider communications band than the communication line 108. The reference numeral 109 is a router for the network 103 connected to the communication line 107. The reference numeral 110 is the router for the network 104 connected to the communication line 108. The reference numeral 111 is the router for the network 106 connected to the communication lines 107 and 108. The reference numeral 112 is the network management device for controlling the networks 103, 104 and 106.

In FIG. 1, the current server 101 is set with a unique address of A1, the backup server 102 is set with a unique address of A2. The current server 101 is also set with a group address V1.

Figure 2:
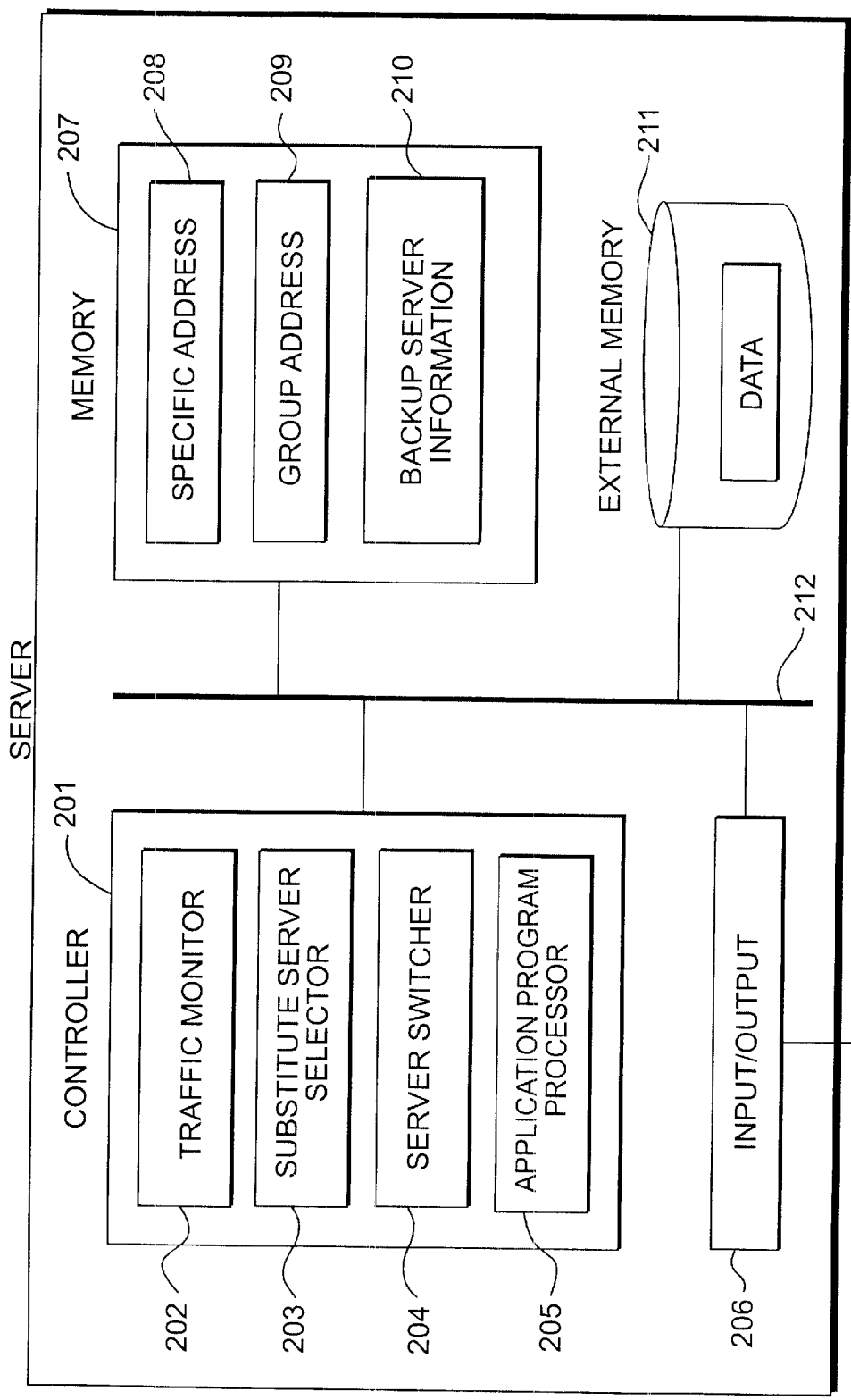
FIG. 2 is a block diagram of the server for the communications system of the first embodiment.

FIG. 2 is a block diagram of the server of this invention.

In FIG. 2, a controller 201 executes the server switching and server functions, a traffic monitor 202 monitors the traffic status between server and client, reference numeral 203 is a substitute server selector for determining and selecting which backup server to use based on backup server information 210 inside a memory 207 related later and traffic information obtained from the traffic monitor 202. A server switcher 204 receives instructions from the substitute server selector 203, and directs handing over of the group address to the backup server and voids the group address that the current server holds. An application program processor 205 for executing the service functions of the server. An input/output (I/O) section 206 provides a communication path between the server and external sections.

Also in FIG. 2, a high speed memory 207 holds control information of all types. A holding section 208 in the memory 207 holds the specific address (unique address) assigned to this server. A holding section 209 in the memory 207 holds a group address assigned only to this server from among a plurality of servers. A holding section 210 inside the memory 207 holds backup server information of all types relating to the backup server. An external memory 211 holds data such as traffic information and information relating to the application program. A internal bus 212 mutually connects the controller 201, the memory 207, the input/output (I/O) 206 and the external memory 211.

The configuration shown in FIG. 2 only lists the main elements required for server switching so the various function elements the server provides to the client are omitted.

Figure 3:
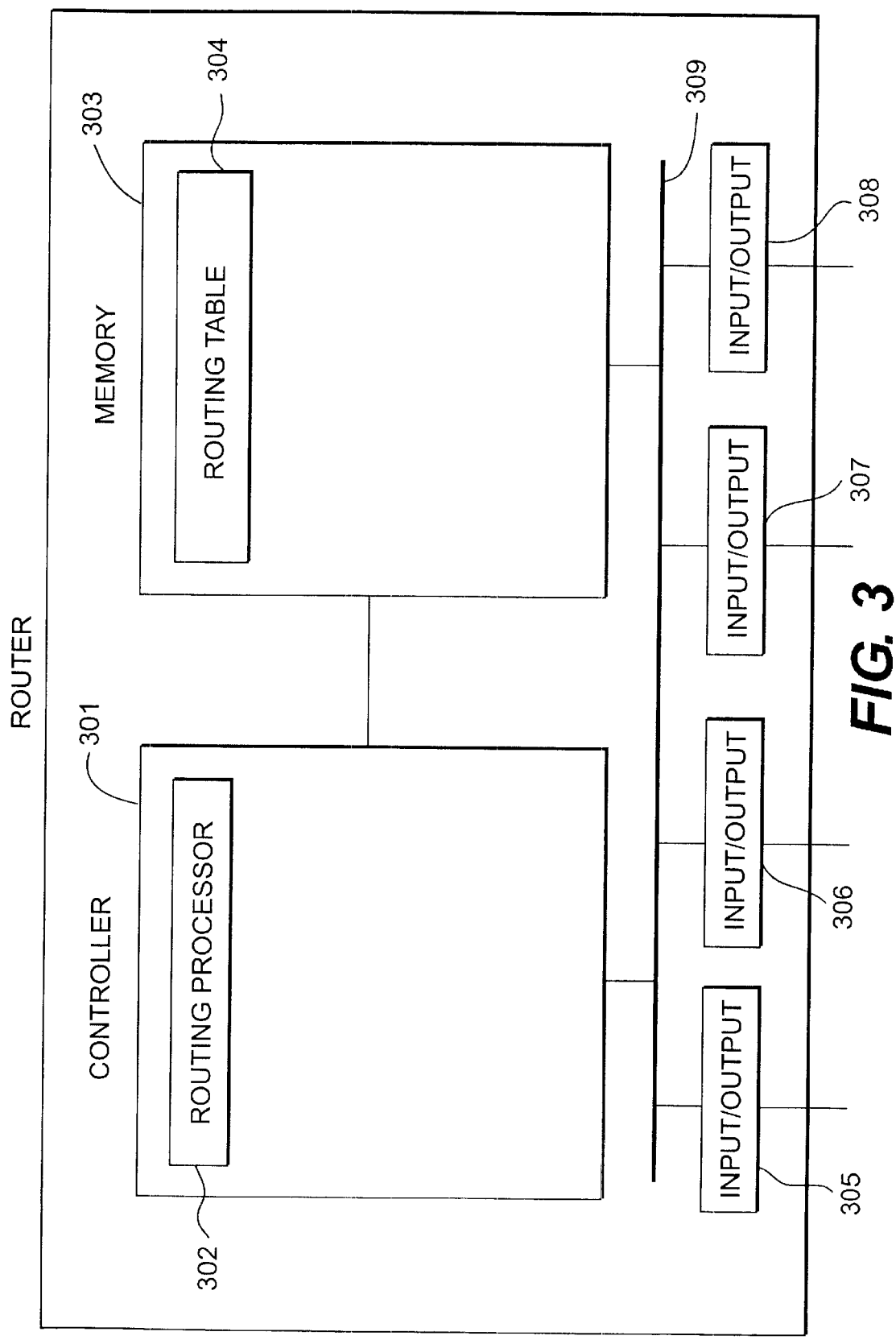
FIG. 3 is a block diagram of the router for the communications system of the first embodiment.

FIG. 3 is a block diagram of the router of this invention.

In FIG. 3, a controller 301 executes the router functions of this invention. A routing processor 302 performs path selection for the packet and packet transfer processing. The reference numeral 303 denotes a memory for holding information of various types. A routing table 304 stores the network path information in the memory 303. The reference numerals 305 through 308 are input/output (I/O) sections for transmitting and receiving the packets of this router. An internal bus 309 mutually connects the controller 301, the memory 303 and the input/output sections (I/O) 305 through 308.

The configuration shown in FIG. 3 is primarily for describing the main elements required for server switching so the detailed routing structure basic to the router functions are omitted.

Figure 4:
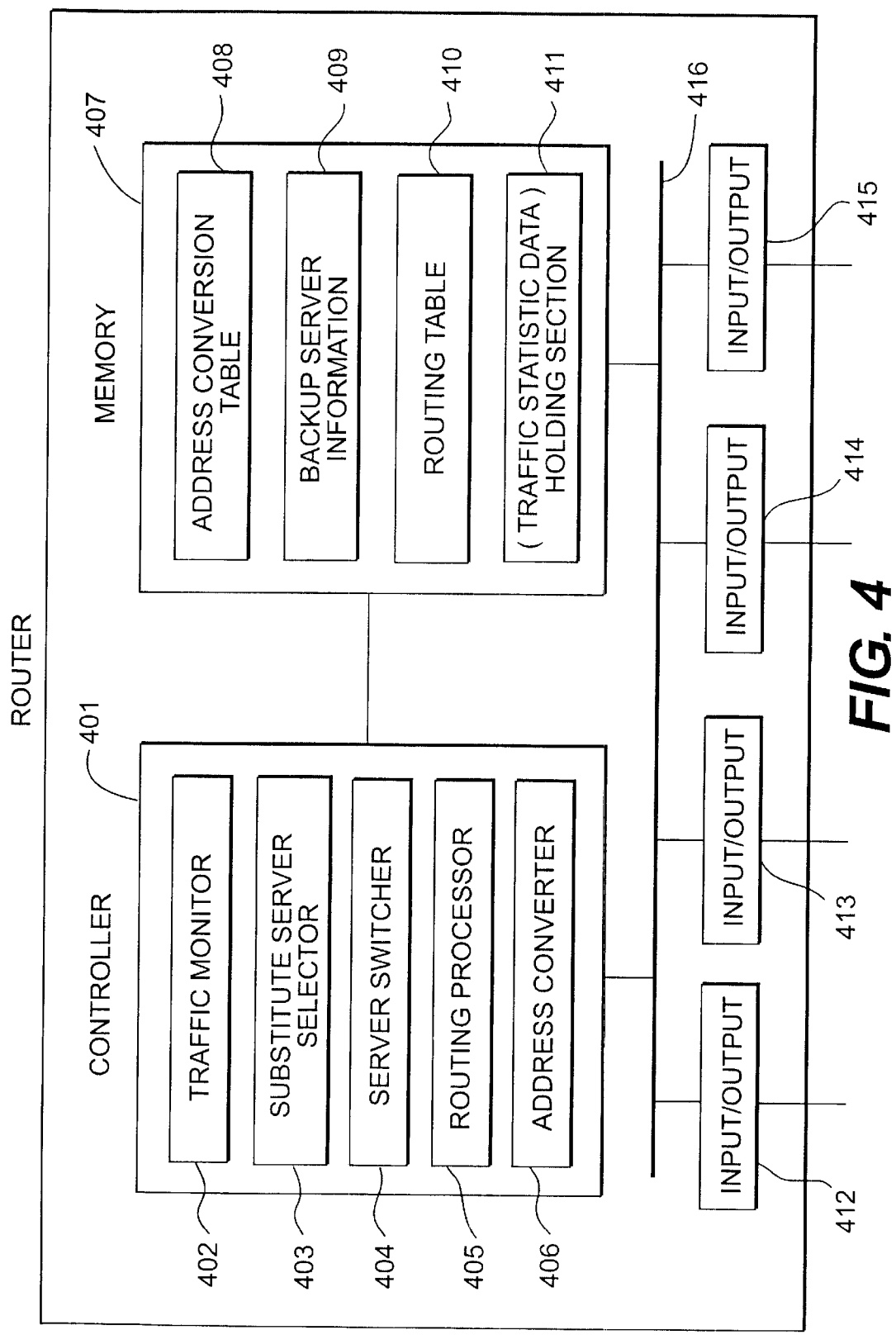
FIG. 4 is a block diagram showing the communications system of the second embodiment of this invention.

FIG. 4 is a block diagram of another router of this invention.

In FIG. 4, a controller 401 executes the router functions of this invention. A traffic monitor 402 monitors the traffic status between the server and client. Reference numeral 403 is a substitute server selector for determining and selecting which backup server to use based on backup server information 409 inside a memory 407 related later and traffic information obtained from the traffic monitor 402. A server switcher 404 provides instructions on server switching to all related servers by way of instructions from the substitute server selector 403. A routing processor 405 performs packet path selection and transfer processing. An address converter 406 performs conversion of the server unique address and group address.

Further, a memory 407 stores all types of information at high speed. An address conversion table 408 lists the relation of the unique address of the server and the group address. A holding section 409 inside the memory 407 holds all types of backup server information involving the backup server. A routing table 410 holds the network path information. A holding section 411 inside the memory 407 holds statistical data on traffic between client and server. The input/output (I/O) sections 412 through 415 perform transmission and reception of the packets of this router. The internal bus 416 mutually connects the controller 401, the memory 407 and the input/output (I/O) sections 412 through 415.

The configuration shown in FIG. 4 is primarily for describing the main elements required for server switching so the detailed routing structure basic to the router functions are omitted.

Figure 5:
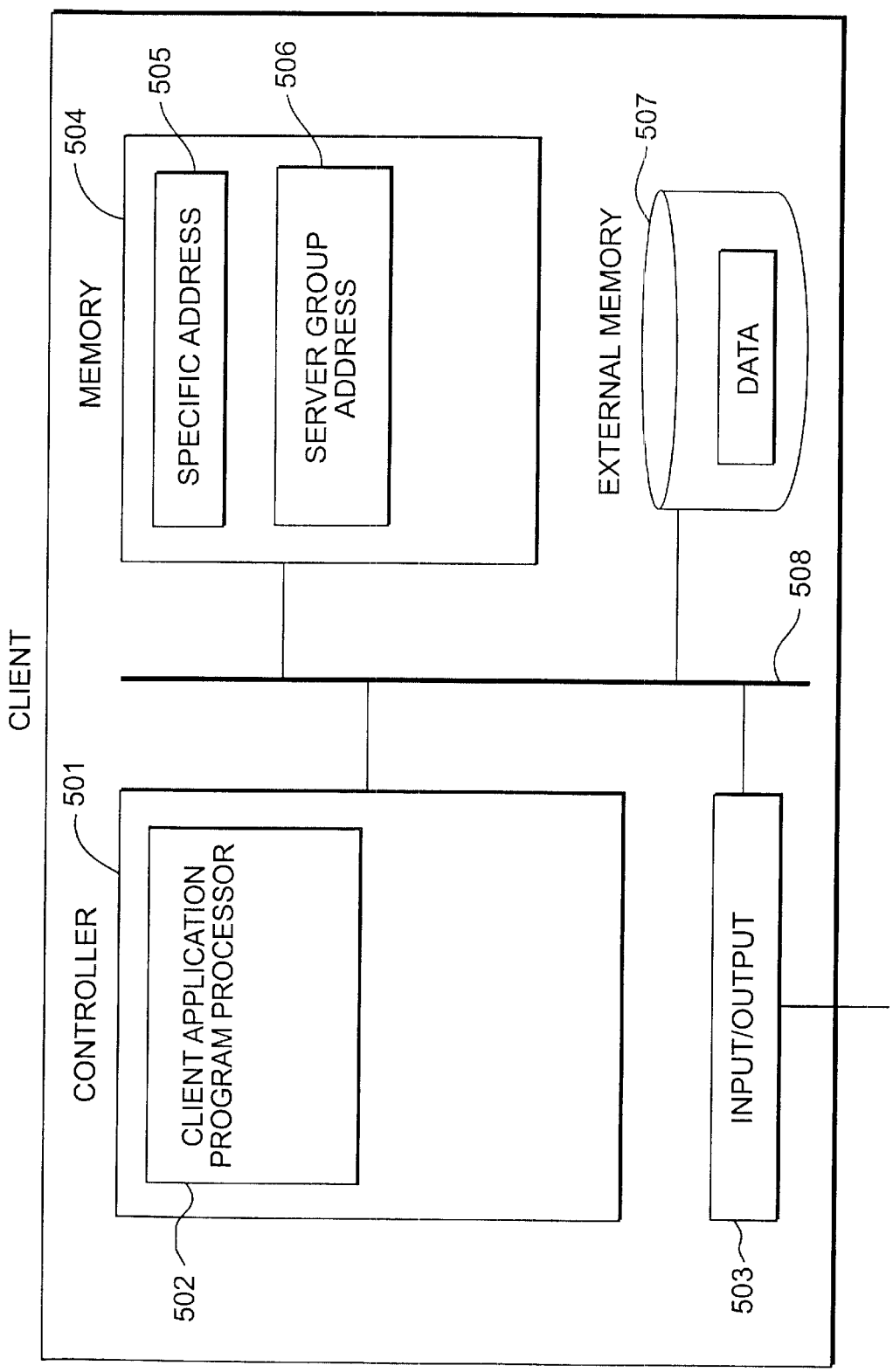
FIG. 5 is a block diagram of the client system in, the communications system of the first embodiment.

FIG. 5 is a block diagram of a typical client utilized in this invention. This invention does not have changes added on the client side so that FIG. 5 does not include items essential to this invention however a simple explanation is related next for items that will prove necessary later on.

In FIG. 5, a controller 501 holds functions for controlling the operation of the client. A client application program processor 502 runs on the client. An input/output (I/O) section 503 transmits and receives the packets when the client is communicating with an external section. A memory 504 stores at high speed, information required for the operation of the client. A holding section 505 inside the memory holds information on the specific address (unique address) assigned to the client. A holding section 506 inside the memory holds information on the group address of the server the client is utilizing for communications. A large capacity external memory device 507 stores all types of information longer and in larger amounts than does the memory 504. An internal bus 508 mutually connects the external memory device 507, the controller 501, the memory 504 and the input/output (I/O) section 503.

The configuration of this client only lists portions relating to operation of the server switcher so portions relating to other processes have been omitted.

Figures 8, 9:
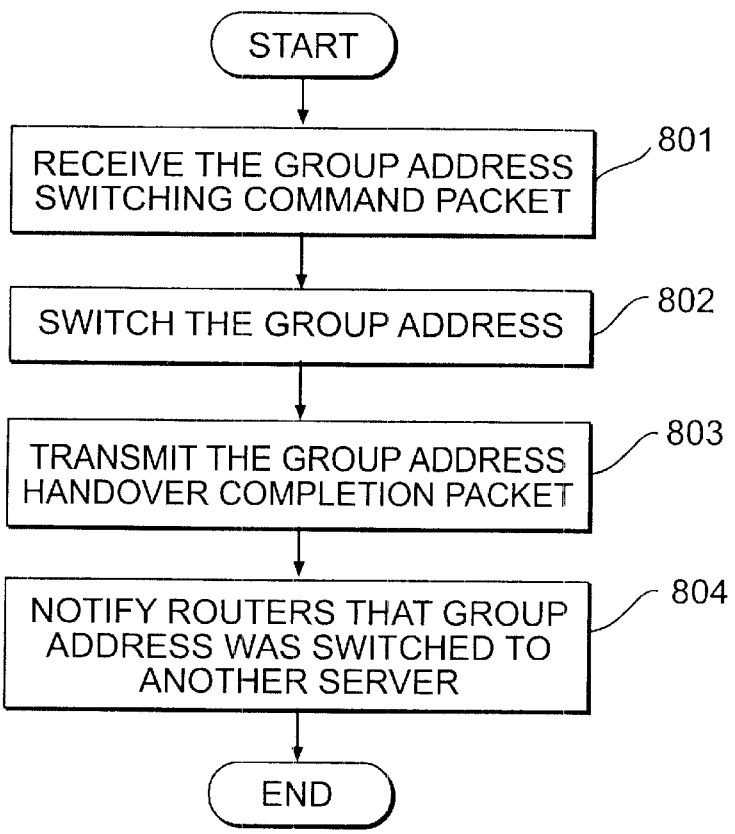
FIG. 8 is a flowchart describing typical operation of the first and second embodiments.
FIG. 9 is an address conversion table for the communications system of the second embodiment.

FIG. 9 shows the address conversion table 408 of the router (See FIG. 4).

In FIG. 9, the reference numeral 901 denotes a specific address (unique address) field of the server and the reference numeral 902 denotes a group address field showing the address value when holding an assigned group address and also showing whether or not each server holds an assigned group address.

A detailed description of the operation of this embodiment is next related utilizing a flowchart.

Figure 7:
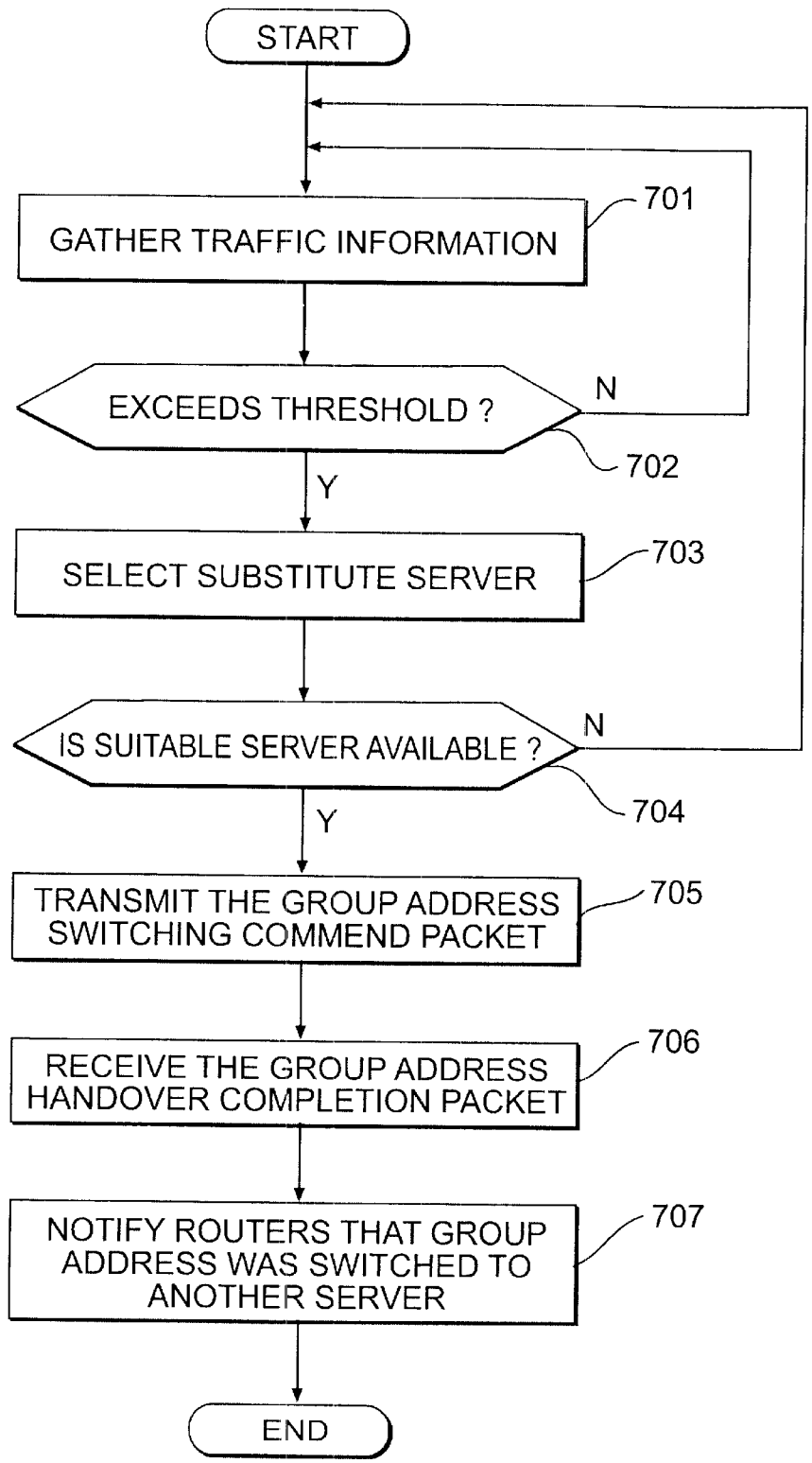
FIG. 7 is a flowchart describing typical operation of the first and second embodiments.

FIG. 7 is a flowchart showing the operation of the current server. FIG. 8 is a flowchart showing the operation of the backup server.

As described for FIG. 1, the current server 101, the backup server 102 and the client server 105 each hold their own unique addresses A1, A2 and A3 for identification and communication. Further, the server 101 assigns a group address V1 different from the unique addresses. When the client 105 receives service from the server, this groups address is specified and communication performed.

In the communication system of FIG. 1, communication is carried out between the client 105 and the current server 101. When at this time, the current server 101 is accessed by a plurality of clients, the available space (idle channel) of the communication line 107 becomes quite limited due to other traffic.

The current server 101 sends out a return trip packet (shuttle packet) at periodic intervals from the monitor 202 in order to measure the response time for the client 105 (traffic information collection: step 701). A typical example of such return trip packets is the JCMP (Internet Control Message Protocol) echo protocol of the TCP/IP (Transmission Control Protocol/Internet Protocol) . The current server also obtains statistics about how much traffic is being issued by the client 105. This process allows the current server 101 to constantly know the traffic status on the communication line. Further, the backup server 102 periodically measures the response time for the client 105 by using the same technique.

When the response time results from the client 105 exceed preset threshold values by a fixed number of times (step 702:Y), the current server 101 notifies the substitute server selector 203 and selection processing by the group server is now performed (step 703). The reason for using a fixed number of times for measurement results exceeding the threshold values as a criterion for whether switching is needed or not, is that even if the response time is momentarily bad and exceeds the threshold value, the average traffic load will probably present no problems during communication if the number of times the threshold value was exceeded is low.

The substitute server selector 203 for the current server 101 determines (step 703) if traffic is low between the client and the alternate servers and whether this other server can adequately process the traffic of the current server 101 based on the response time settings of the backup server information 210. This backup server information 210 contains different types of information capable of being set beforehand such as the unique address of the server, the server OS (operating system), the application program held by the server, the network interface, the total bandwidth of the communication line from the client to that server, the fees for that communication line, the submachine performance and the owner of the server.

The substitute server selector 203 inquires as to how much response time the backup server (proxy server candidate) 102 can guarantee for the client 105. This backup server (proxy server candidate) 102 measures with return trip packets, the amount of response time to this client or measures the response time to the designated client by means of a request from the current server 101 or does not measure the performance but knows that the backup server has ample traffic processing capability by means of prior acquired knowledge. By any of these methods the current server is contacted with the information that an adequate response time can be guaranteed.

In the server 101, an overall determination is made based on this information, the server 102 to be used as the target backup server is decided and a request is made to the server switcher 204 to perform server switching.

The server switcher 204 acquires the unique address of the candidate substitute server from the backup server information 210 and a packet (group address switching command packet) is sent (step 705) commanding hand over of the group address V1.

The group address V1 is acquired (step 801) by the backup server 102 from the packet sent from the current server 101 and setting changes are dynamically performed (step 802) so that communication with this group address V1 is possible. When the handing over of the group address V1 is completed in the backup server 102 a notification (group address handover completion packet) that handing over of V1 is complete is sent to the current server 101 (step 803).

The current server 101 receives this completion packet (step 706) and terminates communication on the group address V1. The information that the current server 101 has eliminated the group address V1 as its own address is conveyed to the router 109 by means of the dynamic routing protocol and the router 109 conveys (step 707) to the router 111 and the router 110 the information that the path of the group address V1 has been eliminated. In the backup server 102 on the other hand, after a sufficient amount of time has elapsed for elimination of the group address V1 and path of the current server 101, the group address V1 is conveyed by dynamic routing protocol to the router 110. The router 110 then conveys information on the path to the router 111 and the router 109 (step 804). By this process, the current server has been switched from the server 101 to the server 102. By switching the current server in this way from the server 101 to the server 102, server switching can be dynamically achieved without any client setting changes being made. The traffic is also dispersed in this process so that the communication speed and response time obtained by the client is improved.

The measurement of response time when performing server switching can be carried out on one or several group clients or even for all group clients. However, in the latter case, measuring response time for all clients may not be realistic when there is a large number of clients since the measurement load is applied to both the server and the line circuit.

Next, as yet another technique to detect traffic status on the network between the server and client, a method is explained that utilizes a message issued by the discarding of a communications packet due to congestion on the network.

Generally, when congestion occurs on the network and traffic occurs in amounts which cannot be sent or received, then the relay equipment starts limiting the packet flow rate and the system discards packets. For instance, limiting packet flow rates from the transmission source may be accomplished in a method referred to as source quenching in ICMP in TCP/IP (Transmission Control Protocol/Internet Protocol), limiting with TCP window size, and packet discard notification in ICMP error messages. Such notification information is sent from the relay equipment or the corresponding system when the network load has risen to a high level or congestion has occurred. A determination is made based on this information, that communication status has deteriorated and the backup server can then be switched to current server. However, the conditions for switching may be defined beforehand, or the traffic between client and backup server may be measured as described above and switching then may be decided upon.

In determining whether or not to switch to the backup server, several items of information other than those described above may be required.

One such item is empty bandspace (idle bandwidth) information from each server to client and the total traffic volume per unit of time for client processing by the current server. This information is needed because during server switching, the traffic is channeled towards the backup server so the response time is considerably worse than the previously measured response time. Therefore calculating beforehand of what the traffic after server switching will be is necessary since the response time prior to switching will probably be a much better figure.

Other items are the average response time for a client, dispersion of response time for all clients, and worst response time. Even if the average response time for clients is improved by server switching, it might be better not to perform server switching if an extremely bad deterioration in response time then occurs for a portion of the clients.

Yet further required types of attribute information are items such as the network fees when server switching is needed, the owner of the target backup server to be switched to and the performance of that target backup server.

Besides the above example for handing over the group address to the backup server, other methods include storing beforehand the group address in the switching server, and keeping this address normally voided (or deactivated) and then validating (or activating) this group address when a switching command packet for switching to the substitute server is received from the current server.

The server 101 can transmit the necessary data for providing service to the client during handing over of the server group address V1 to the server 102. This transmission of necessary data can be achieved with a method known to collate with attribute information recorded in the backup server information holding section 210, and the current server 101 can even inquire to the candidate backup server each time about attribute information as to whether backup is possible or not. When the server 101 dynamically assigns the group address to the server 102, data to be provided for the client is also simultaneously transferred to the server 102 which now has the group address. This information transferring means that information of all types such as service information no longer has to be prepared beforehand in the backup server so that not only can the storage capacity of the disk be reduced but the number of candidate servers for dynamic switching can be increased.

When the server 101 hands over the group address V1 to the server 102 which will become the current server, an application program needed to supply service to the client can also be sent. This transmission of an application program can be achieved with a method known to collate with attribute information recorded in the backup server information holding section 210, and the current server 101 can even inquire to the candidate backup server each time about attribute information as to whether backup is possible or not. By handing over the application program simultaneously with the group address to the succeeding server (server to be used as current server), the provision of a backup server beforehand also containing an application program is no longer required so that not only can the storage capacity of the disk be reduced but the number of candidate servers for dynamic switching can be increased. This method not only allows executable files in an object format to be sent as the application program by also permits executable formats not dependent on the computer operating system such as applets for JAVA.

2. Second Embodiment

A detailed description of another embodiment of this invention is next explained while referring to the accompanying drawings.

Figure 6:
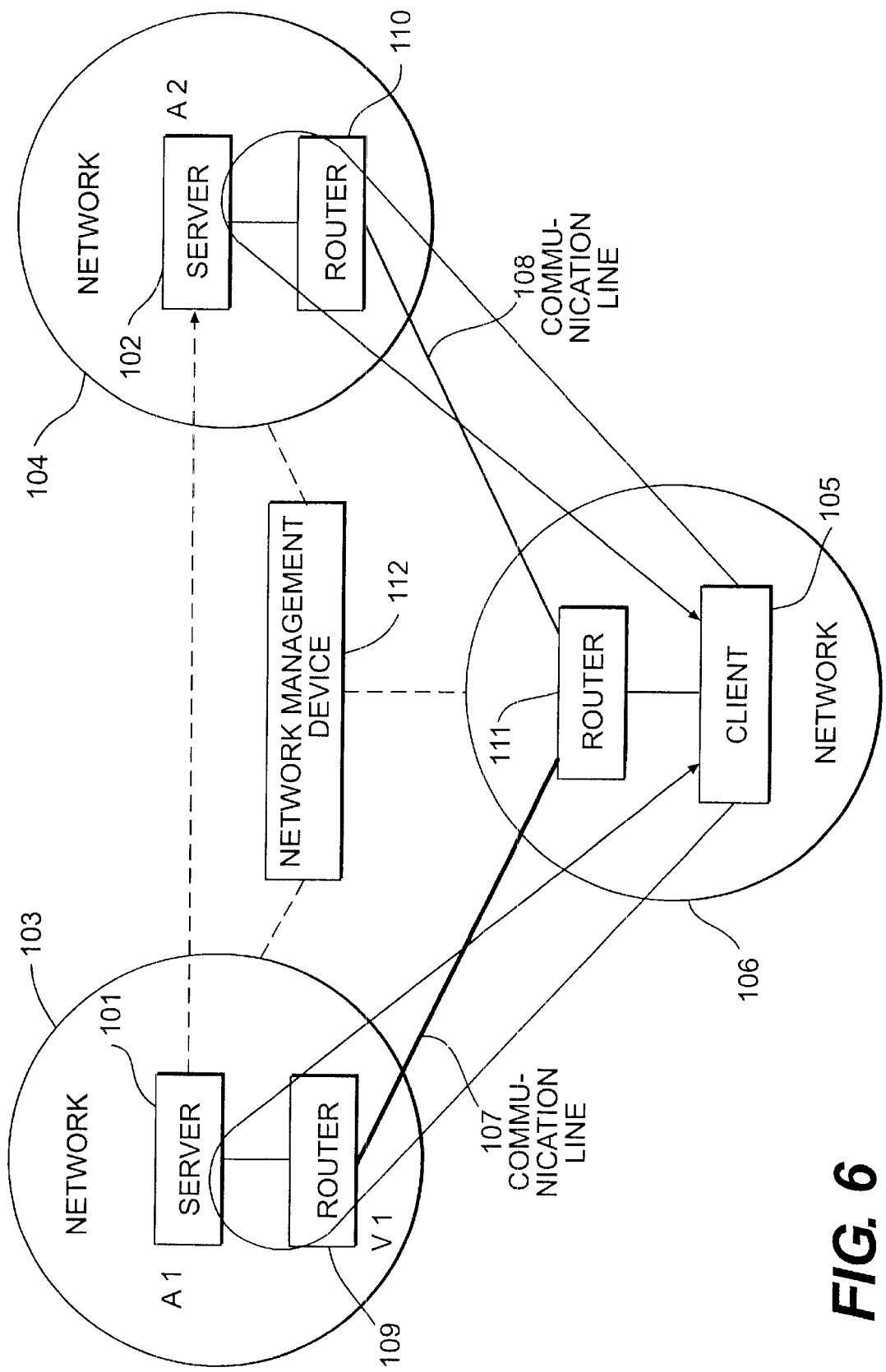
FIG. 6 is a block diagram of the server for the communications system of the second embodiment.

FIG. 6 is a block diagram of the router having the function of dynamically handing over the group address by means of address conversion in the relay equipment.

In this embodiment also, switching of the group address can also be performed in compliance with the flowcharts of FIG. 7 and FIG. 8. However, this embodiment differs from the previously related first embodiment. FIG. 7 is a flowchart showing the router operation for performing address conversion in the current server. FIG. 8 is a flowchart showing router operation for performing address conversion in the backup server.

In the communication system shown in FIG. 6, the group address V1 is initially assigned to the communication line 107 of the router 109. In the communications between the server 101 and the client 105, the group address V1 is utilized for identification of the server 10 between the client 105 and the router 109; and the unique address A1 of the server is utilized for identification of the server 101 in communications between the router 109 and the server 101. The inner layout of the router 109 is shown in FIG. 4. The address converter 406 refers to the address conversion table 408 inside the memory 407 and performs conversion of the server unique address A1 at the server 101 and the group address V1 of communication line 107 at the router 109. Accordingly, conversion of the address portion of all packets is performed between the server 101 and the client 105.

In the communication system shown in FIG. 6, the client 105 initially communicates with the server 101. At this time, the server 101 is accessed by a plurality of clients and the communication line 107 has little empty band space due to other traffic.

In the router 109, the traffic monitor 402 gathers together all the traffic information on the communication line 107 and takes statistics (step 701). A decision is made (step 702) as to whether or not the traffic volume of 107 obtained from the traffic statistic information exceeds the preset threshold values by a certain amount of time. If the traffic volume has exceeded the preset threshold values (step 702:Y) the substitute server selector 403 is notified and selects a substitute server (step 703) based on this notification. In this way, when determined that a replacement server is required due to the measurement results of traffic volume showing that threshold values were exceeded for a certain amount of time, server switching can be performed when really required and not when the average traffic volume is small even if the traffic status is momentarily bad and exceeds the threshold values.

The substitute server selector 403 of the router 109, based on traffic statistical information and the backup server information 409, determines whether or not another server capable of providing service to the client yet having little traffic and capable of processing the traffic of the current server 101 is available (step 704). The various types of information capable of being preset are contained in the backup server information holding section 409. These include all types of information containing the server unique address, router unique addresses having conversion functions for addresses nearest the server, the OS (operating system) of the server, the application program, the network interface, the total bandwidth of the line from the client to that server, the fees for that line, performance of the server machine and the owner of the server, etc. In the substitute server selector 403 an inquiry is made as to what response time can be guaranteed from the candidate substitute server for the client 105 and the necessary information acquired. An overall determination is made by means of this acquired information the router 109 determines the backup server 102 to be used as the replacement (substitute) server and a request for switching servers is made to the server switcher 404 to perform server switching.

When the server switcher 404 has received the request for server switching, it next acquires the unique address of the backup server 102 and the unique address of the nearest router 110 from the backup server information 409 and a group address switching command packet is sent (step 705) to the previously acquired unique address of the router 110 commanding hand over of the group address V1.

When the group address switching command packet is received (step 801), the route 110 records the unique address of the server and the group address in the address conversion table 408 (step 802) and a notification (group address handover completion packet) that handing over of the group address V1 is complete is sent back to the router 109 (step 803).

The router 109 receives this completion packet (step 706) and notifies all routers connected on the network (110, 111 in the example of FIG. 6) by utilizing the dynamic routing protocol that a group address Vl and route from the network 103 likely to be eliminated from that server has been eliminated (step 707).

Afterwards, when the router 110 receives the notice that the group address V1 has been eliminated from the network 103, the router 110 informs all routers connected on the network (109, 111 in the example of FIG. 6) with the information (including related routing information) that a system having a group address V1 is newly available in the network 104 (step 804).

Thus, the switching of servers can be achieved by dynamically changing the address tables in the routers 109 and 110 and this server switching from the server 101 to the server 102 can be achieved without any setting changes on the part of the client 105.

A supplementary explanation is next related for the network traffic status between the servers and client.

Typically in large scale systems, a number of networks may be comprised of relay equipment between the network and client. The relay equipment on the path between the client and the server at this time, constitutes an environment able to monitor and acquire information on all traffic. Providing this relay equipment with the function of gathering traffic statistics, signifies that information such as the overall traffic volume between server and client, other traffic volume and amount of empty band space can all be measured. The traffic information thus obtained can be delivered to the current server and used as information for deciding upon server switching. The examples in the above embodiments showed examples in which the router was installed with traffic detection measurement means or techniques, however custom traffic measuring devices typified by management information gathering equipment such as RMON (Remote Monitoring Management Information Base) may also be utilized for measurement of TCP/IP traffic. Moreover, traffic information obtained from this traffic information gathering equipment (or data bases) may be gathered in the network management device 112 and the above described server switching commands implemented in one consecutive process in this network management device 112.

However when communicating on a number of network paths, accurate decisions cannot be made unless information gathering of traffic information is performed for all networks containing those paths. The server therefore gathers this traffic information from all the relay equipment on these paths. Further, the server does not have to collect all traffic information held in the relay equipment but may use the network management equipment 112 as a substitute and hand this information over to the server. Also, the network management equipment 112 need not hand this traffic information directly to the server but may itself analyze this information and directly transmit server switching command to the server so that the traffic load is appropriately dispersed.

Congestion related messages may be utilized as another means or technique to find the network load status. For instance, a packet flow limiter command referred to as source quench in ICMP for TCP/IP, or a packet transmit/receive limiter by means of TCP window size, or a packet discard notice in the ICMP error message which is returned to the transmission source may all be used as congestion messages. These congestion messages are sent from the relay equipment or corresponding system when congestion or a high network load occur. This information allows a deterioration in communication status to be determined. Packet discard notification messages in particular are sent every time a packet is discarded so the router gathers statistics and when a set count is reached a technique or means determines that server switching is needed. This determination may also be made by the server.

Taking the following into account will prove effective as criteria for selecting a substitute server per the server and router.

One measure is using the average traffic or the average response time per unit of time on the path between the servers and client as a criteria for switching the server. This factor is not for a momentary worsening of traffic characteristics but more nearly a criteria for determining a chronic worsening of traffic flow. Further, this factor is also important when a plurality of clients are present, since the response time and traffic flow for a number of group clients is measured so that the average communication speed for the client overall will be improved by server switching and the average communication speed of the client overall will be improved. Rather than the response time with respect to the client, this is also effective in measuring the response time of the return trip packet at the router which is the termination of the communication line. Also, when the communication line being used is changed due to the switching of the server, the switching may be cancelled because fees for the line exceed a set figure or when there is a different owner and fees will be incurred by using the backup, then taking measures such as raising the threshold values for server switching criteria will prove effective.

In measuring traffic, traffic statistics are acquired on the field attribute information of each communication packet such as the transmit source address, destination address, transmit source application identifier, destination application identifier as well as their order of priority of each parameter. Markers showing the degree of importance can be assigned beforehand to the flow of this attribute data and determining whether or not to perform switching according to the order of importance of the flow at the network to be changed will prove effective in an environment where designated communications must be given priority.

In this embodiment, dynamically handing over the group address can be accomplished by changing the address conversion table between the router 109 and 110 however this can also be accomplished by providing the router 111 with these functions. If the router 111 can perform these functions then a group address switching command packet and a group address hand over completion notification packet do not have to be sent and received between the router 109 and 110. All such equivalent functions can be achieved inside the router 111. There is also the advantage in such cases, that there is no need to notify the overall network on information paths by utilizing dynamic routing and that the time required for switching can be shortened.

FIG. 9 is a typical address conversion routing table 408. The unique address of each server is recorded in the "Server specific address" of field 901, and the particular value is recorded in "Group address" of field 902 if the group address for that server was received and a "None" is recorded in "Group address" of field 902 if no assignment was received. The example in FIG. 9 shows the case where a server having the unique address A1 is assigned the group address V1, and servers having the unique addresses A2 through A5 are not assigned a group address.

The following effects can therefore be obtained from the embodiments.

Firstly, when the network traffic increases between the client and server and the client cannot obtain a sufficient communicating speed, the above embodiments switch the current server to a server on a network having sufficient empty communication line space so that the network traffic load can be dynamically and uniformly distributed and further the server switching can be performed with any setting changes or additional control functions being made by the client.

Secondly, by installing address conversion functions in the router, the interrelation of the group address and unique address can be dynamically changed so that the server can be switched without server switching or additional setting changes taking place between client and server.

Thirdly, even if a problem at the server disables communication, server switching can be performed by the router address conversion function so that the client can continue to receive service.

This invention therefore, when configured as previously described, can provide a communications system able to dynamically switch servers, the source for generating traffic, on the network without rerouting of paths on which traffic is concentrated and requiring no change settings or addition of control functions by the client and further able to effectively use portions of the network having low usage rates.

What is claimed is:

1. A server that is assigned a group address and is accessed from a client by using said group address, comprising;
   a detecting means for detecting traffic status between said client and said server,
   a selecting means for selecting an appropriate server for said client to access based on traffic status detected by said detecting means,
   a means for handing over said group address from said server to said selected appropriate server,
   wherein said selected appropriate server stores said group address and invalidates said group address, and
   said means for handing over said group address sends a packet for directing said selected appropriate server to validate said stored group address.

2. A server according to claim 1, wherein
   said means for handing over said group address sends a switching command packet containing said group address to said selected appropriate server.

3. A method of handing over a group address that is assigned to a communication apparatus to another communication apparatus , said communication apparatus being accessed from a client by using said group address, comprising the steps of;
   detecting traffic status between said client and said communication apparatus,
   selecting another communication apparatus for said client to access based on detected traffic status,
   handing over said group address from said communication apparatus to said selected another communication apparatus,
   wherein said selected another communication apparatus stores said group address and invalidates said group address, and
   said handing over step includes a step of sending a packet for directing said selected another communication apparatus to validate said group address.

4. A method according to claim 3, wherein
   said handing over step includes a step of sending a switching command packet containing said group address to said selected another communication apparatus.

5. A communication method according to claim 3, further comprising;
   providing a relay equipment installed between the client and server, said relay equipment performs conversion between the group address and the unique address of the server, thereby communication is performed utilizing the unique address of the server between said server and said relay equipment and the group address of said server between said client and said relay equipment.

6. A method according to claim 3, wherein
   said detecting step includes a step of sending a return packet to said client for measuring a response time between said client and said communication apparatus.

7. A method according to claim 3, wherein
said detecting step comprising the steps of;
providing a traffic measuring apparatus on a communication path between said client and said communication apparatus,
monitoring traffic on the communication path to measure traffic.

8. A method according to claim 3, wherein
said detecting step includes a step of receiving a message from a network which is sent when a communication packet has been discarded due to congestion on the network.

* * * * *